United States Patent
Martinez Alonzo

(10) Patent No.: US 11,613,916 B2
(45) Date of Patent: Mar. 28, 2023

(54) APPARATUS AND METHOD FOR OPERATING MULTIPLE LATCHES WITH A SINGLE PULL

(71) Applicant: Inteva Products, LLC, Troy, MI (US)

(72) Inventor: Alfredo Martinez Alonzo, Chihuahua (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 209 days.

(21) Appl. No.: 16/853,298

(22) Filed: Apr. 20, 2020

(65) Prior Publication Data

US 2020/0332569 A1 Oct. 22, 2020

Related U.S. Application Data

(60) Provisional application No. 62/836,384, filed on Apr. 19, 2019.

(51) Int. Cl.
*E05B 79/20* (2014.01)
*E05B 85/10* (2014.01)
(Continued)

(52) U.S. Cl.
CPC .............. *E05B 79/20* (2013.01); *E05B 83/36* (2013.01); *E05B 85/10* (2013.01); *F16C 1/06* (2013.01); *F16C 1/101* (2013.01); *F16C 1/105* (2013.01); *F16C 1/106* (2013.01); *F16C 1/12* (2013.01); *E05Y 2900/50* (2013.01)

(58) Field of Classification Search
CPC .......... E05B 53/005; E05B 79/20; F16C 1/10; F16C 1/12; F16C 1/101; F16C 1/22; F16C 1/06; F16C 1/105; F16C 1/106
See application file for complete search history.

(56) References Cited

U.S. PATENT DOCUMENTS

| 5,829,314 A * | 11/1998 | Scura ...................... B62M 25/04 188/24.11 |
| 2014/0132011 A1* | 5/2014 | Krishnan ................. E05B 79/20 292/217 |

(Continued)

FOREIGN PATENT DOCUMENTS

JP 01163810 A * 6/1989 .............. F16C 1/101

OTHER PUBLICATIONS

Machine Translation of JP 01163810.*

*Primary Examiner* — Brian J Mcgovern
(74) *Attorney, Agent, or Firm* — Cantor Colburn LLP

(57) ABSTRACT

A mechanism for use with multiple latches that are to be released by a single handle and by a single pull. A method for actuating multiple latches with a single handle and by a single pull. A release mechanism for use with multiple latches that are to be released by a single handle and by a single pull, including: a first member slidably received within a housing; a second member rotatably secured to the first member for movement about an axis within the housing and with respect to the first member; a first cable secured to the first member and slidably received within the housing; a second cable secured to the second member and slidably received within the housing; and a third cable secured to the second member and slidably received within the housing, wherein the second cable is shorter than the first cable.

20 Claims, 7 Drawing Sheets

(51) Int. Cl.
    *E05B 83/36*     (2014.01)
    *F16C 1/10*     (2006.01)
    *F16C 1/06*     (2006.01)
    *F16C 1/12*     (2006.01)

(56) References Cited

U.S. PATENT DOCUMENTS

2017/0254354 A1*   9/2017   Carabalona  .............  F16C 1/106
2020/0262279 A1*   8/2020   Hirozawa  ...............  B60R 25/24

* cited by examiner

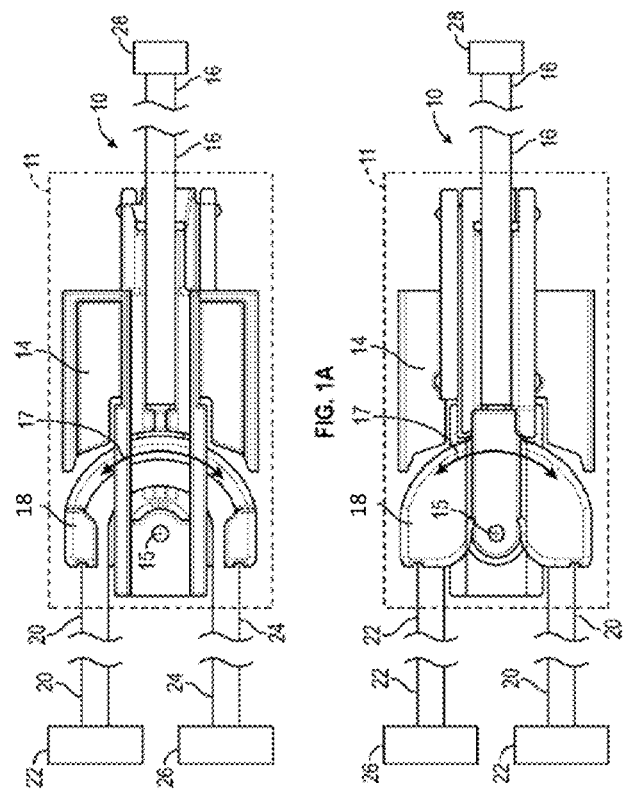

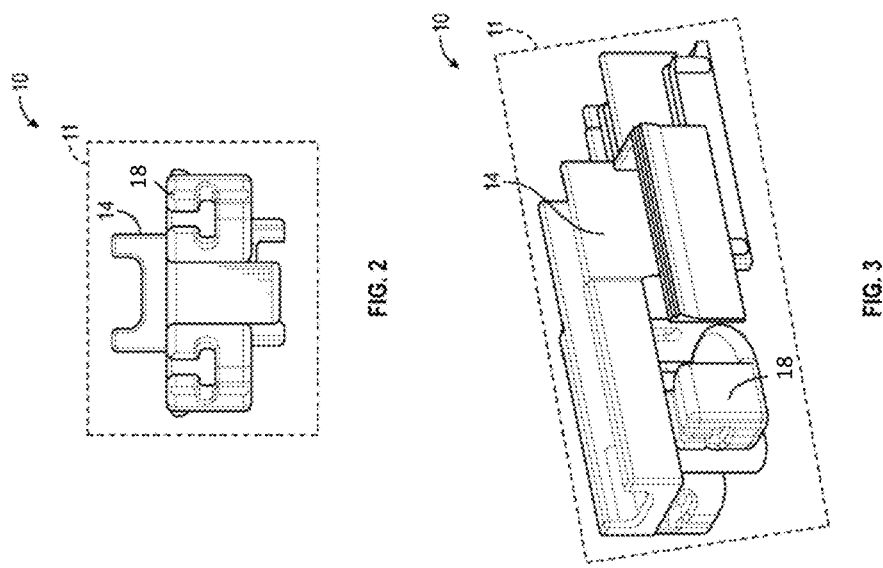

APPARATUS AND METHOD FOR OPERATING MULTIPLE LATCHES WITH A SINGLE PULL

CROSS REFERENCE TO RELATED APPLICATIONS

This application claims the benefit of U.S. Provisional Patent Application No. 62/836,384 filed on Apr. 19, 2019, the contents of which are incorporated herein by reference thereto.

BACKGROUND

Exemplary embodiments of the present disclosure pertain to the art of vehicle latch assemblies or latching systems.

In applications where multiple latches are desired to be released by a single handle and by a single pull, is necessary to incorporate a system that compensates the release travel between the multiple latches due to accumulated tolerances by all the components involved in the release mechanism.

BRIEF DESCRIPTION

Disclosed is a mechanism for use with multiple latches that are to be released by a single handle and by a single pull.

Also disclosed is a release mechanism for use with multiple latches that are to be released by a single handle and by a single pull, including: a first member slidably received within a housing; a second member rotatably secured to the first member for movement about an axis within the housing and with respect to the first member; a first cable secured to the first member and slidably received within the housing; a second cable secured to the second member and slidably received within the housing; and a third cable secured to the second member and slidably received within the housing, wherein the second cable is shorter than the first cable.

In addition to one or more of the features described above, or as an alternative to any of the foregoing embodiments, the second cable is secured to the second member at one side of an axis of rotation of the second member with respect to the first member and the third cable is secured to the second member at an opposite side of the axis of rotation of the second member with respect to the first member.

In addition to one or more of the features described above, or as an alternative to any of the foregoing embodiments, the first cable is slidably received within a cable sheath.

In addition to one or more of the features described above, or as an alternative to any of the foregoing embodiments, the first cable is secured to a handle.

Also disclosed is a latch system, including: a first latch; a second latch; a release mechanism operably coupling a first cable to the first latch and the second latch, the release mechanism including: a first member slidably received within a housing, the first cable being secured to the first member at a first end; and a second member rotatably secured to the first member for movement about an axis within the housing and with respect to the first member; a second cable secured to the first latch at one end and the second member at an opposite end, the second cable being slidably received within the housing; a third cable secured to the second latch at one end and the second member at an opposite end, the third cable being slidably received within the housing, wherein the second cable is shorter than the first cable.

In addition to one or more of the features described above, or as an alternative to any of the foregoing embodiments, the second cable is secured to the second member at one side of an axis of rotation of the second member with respect to the first member and the third cable is secured to the second member at an opposite side of the axis of rotation of the second member with respect to the first member.

In addition to one or more of the features described above, or as an alternative to any of the foregoing embodiments, the first cable is slidably received within a cable sheath.

In addition to one or more of the features described above, or as an alternative to any of the foregoing embodiments, the first cable is secured to a handle at a second end, the first end being opposite end to the second end.

In addition to one or more of the features described above, or as an alternative to any of the foregoing embodiments, the second cable and the third cable are each slidably received within a cable sheath.

In addition to one or more of the features described above, or as an alternative to any of the foregoing embodiments, the rotational movement of the second member allows the first member to continue to slide within the housing after either the second cable or the third cable reaches a limit of travel.

In addition to one or more of the features described above, or as an alternative to any of the foregoing embodiments, the second cable is secured to the second member at one side of an axis of rotation of the second member with respect to the first member and the third cable is secured to the second member at an opposite side of the axis of rotation of the second member with respect to the first member.

In addition to one or more of the features described above, or as an alternative to any of the foregoing embodiments, the first cable is secured to a handle at a second end, the first end being opposite end to the second end.

In addition to one or more of the features described above, or as an alternative to any of the foregoing embodiments, the first cable, the second cable and the third cable are each slidably received within a cable sheath.

Also disclosed is a method of actuating a first latch and a second latch of a latch system with a single cable, including: operably coupling a first cable to the first latch and the second latch with a release mechanism, the release mechanism including: a first member slidably received within a housing, the first cable being secured to the first member at a first end; and a second member rotatably secured to the first member for movement about an axis within the housing and with respect to the first member; securing a second cable to the first latch at one end and the second member at an opposite end, the second cable being slidably received within the housing; securing a third cable to the second latch at one end and the second member at an opposite end, the third cable being slidably received within the housing, wherein the second cable is shorter than the first cable.

In addition to one or more of the features described above, or as an alternative to any of the foregoing embodiments, the second cable is secured to the second member at one side of an axis of rotation of the second member with respect to the first member and the third cable is secured to the second member at an opposite side of the axis of rotation of the second member with respect to the first member.

In addition to one or more of the features described above, or as an alternative to any of the foregoing embodiments, the first cable is secured to a handle at a second end, the first end being opposite end to the second end.

In addition to one or more of the features described above, or as an alternative to any of the foregoing embodiments, the first cable, the second cable and the third cable are each slidably received within a cable sheath.

BRIEF DESCRIPTION OF THE DRAWINGS

The following descriptions should not be considered limiting in any way. With reference to the accompanying drawings, like elements are numbered alike:

FIG. 1A illustrates a plane view of a release mechanism of the present disclosure;

FIG. 1B illustrates an opposite plane view of the release mechanism of FIG. 1B;

FIG. 2 is an end view of the release mechanism of FIG. 1A;

FIG. 3 is a perspective view of the release mechanism of FIG. 1A; and

DETAILED DESCRIPTION

A detailed description of one or more embodiments of the disclosed apparatus and method are presented herein by way of exemplification and not limitation with reference to the Figures.

Disclosed herein is a robust solution to a latching system where extremes release travels conditions, minimum and maximum release travel condition, could represent a partial opening of the latches.

The present disclosure is directed to interaction between a couple of levers but not limited to where one of the levers connects with the release handle and the other lever connects to the release mechanism of multiple latches, this connection to the levers can be done through cable, rod, link, levers or any other mechanism.

The interaction between these levers allows a balance to start pulling the different release mechanism between latches at the same time, this balance is given basically by the magnitude of the force on each latch.

In extreme cases where release travel between latches are opposite, meaning the shortest release travel in one of the latches and the longest release travel in other latch in the same system and also with different behavior between them with respect to release effort, the hard stop in the latch with shortest release travel will balance the travel in the latch with the longest release travel in order to release all the latches with a single pull.

Figure 4:
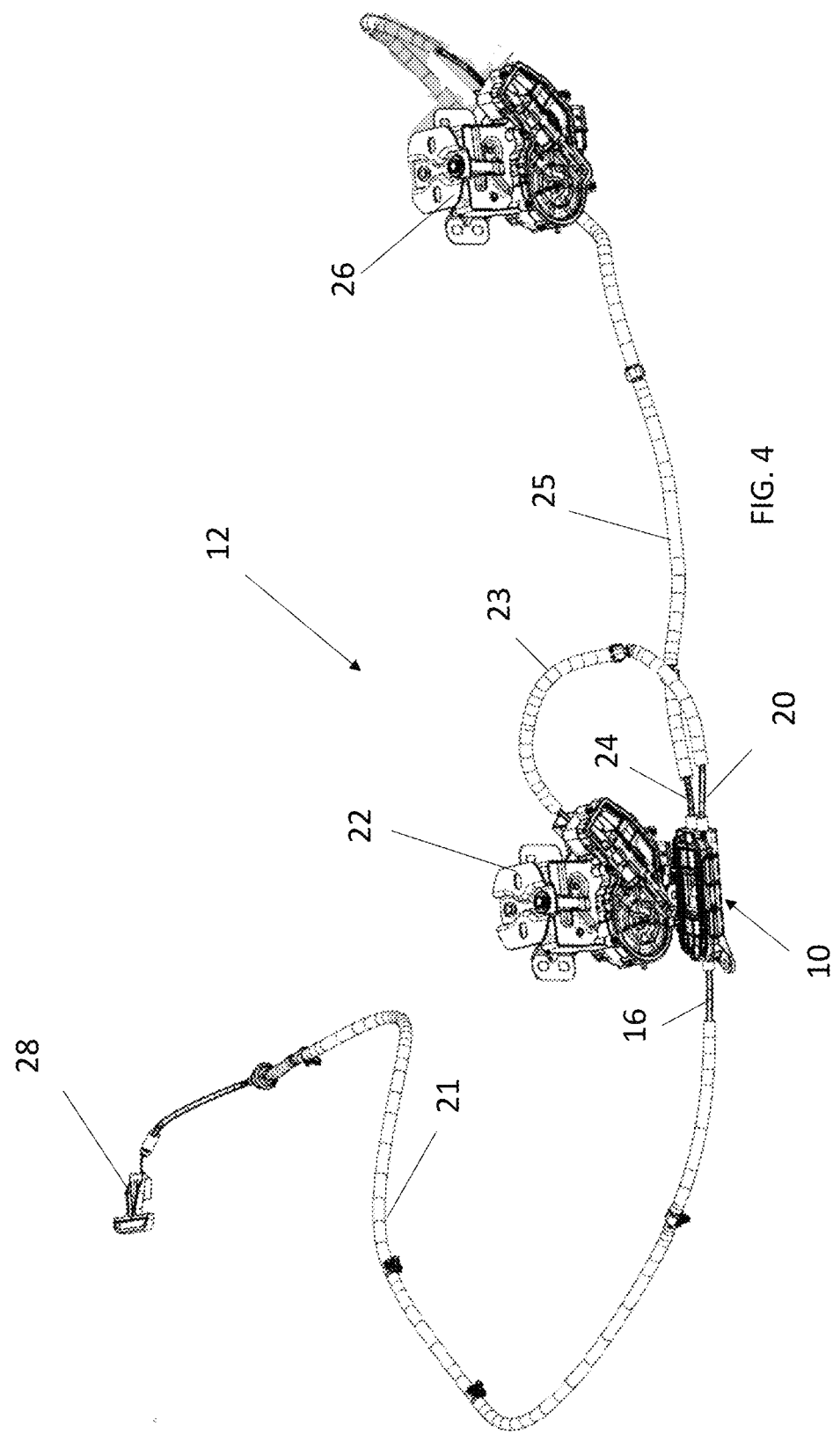
FIGS. 4-8 illustrate a latch system with a release mechanism in accordance with the present disclosure.
Figure 5:
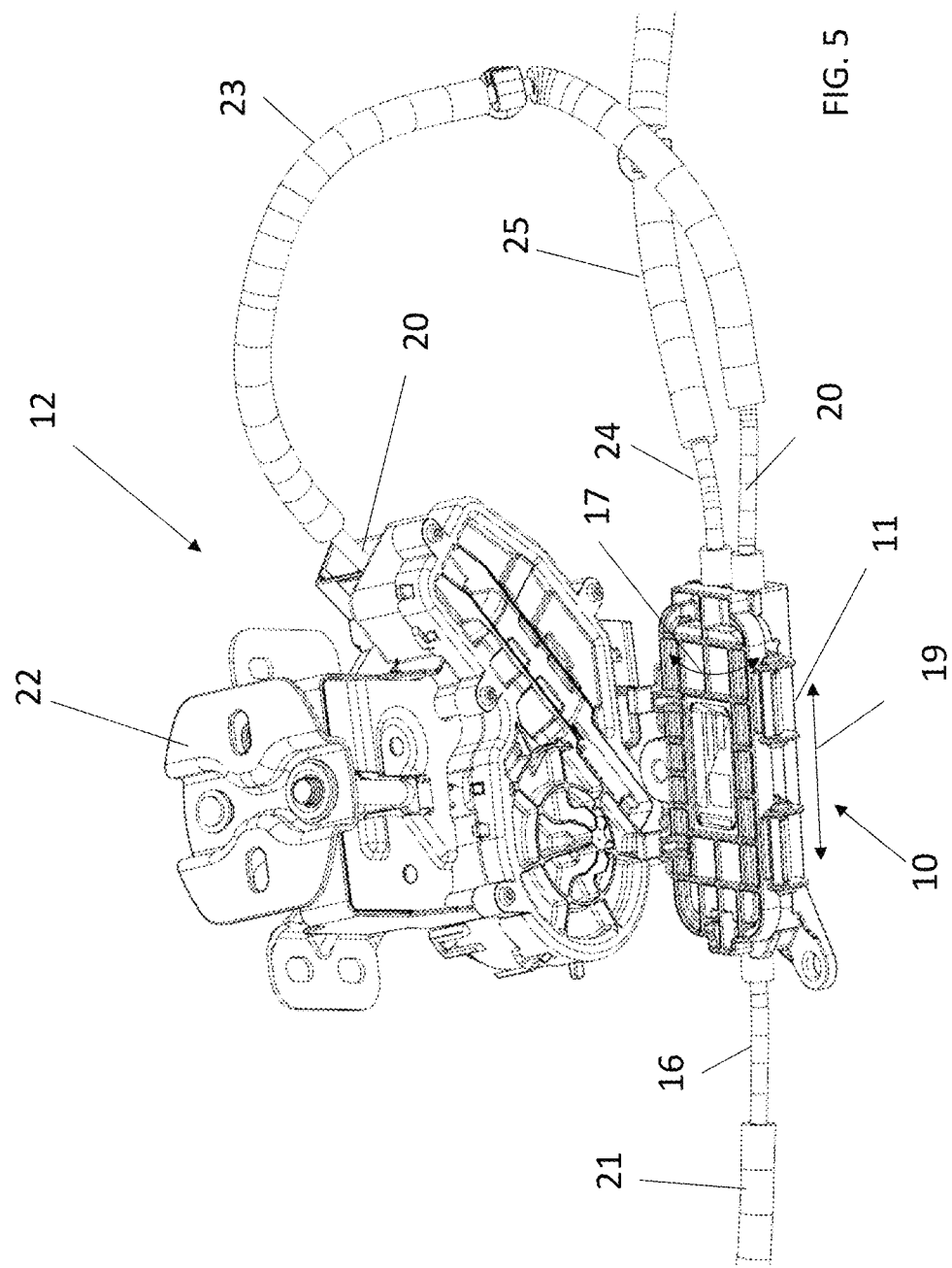
Figure 6:
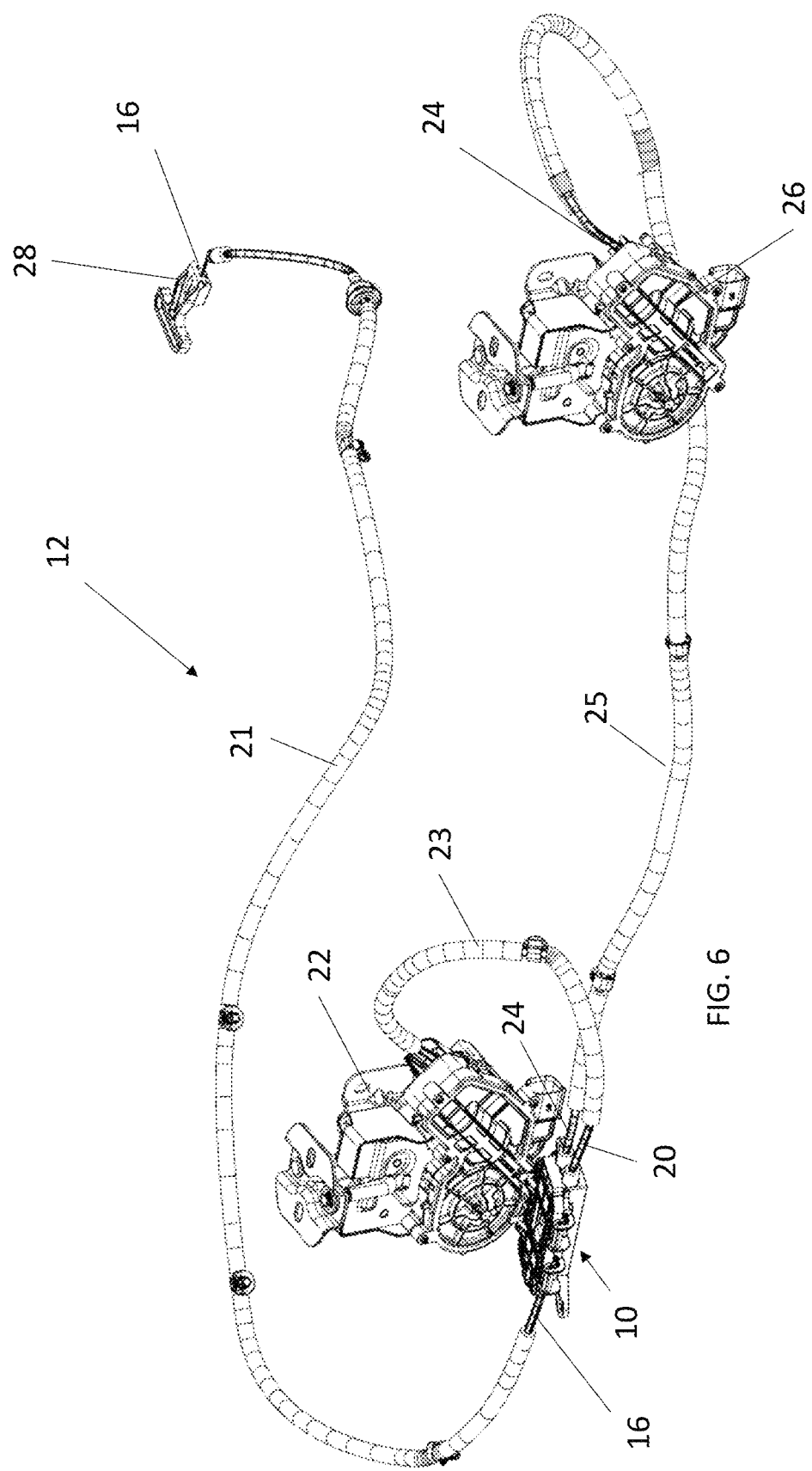
Figure 7:
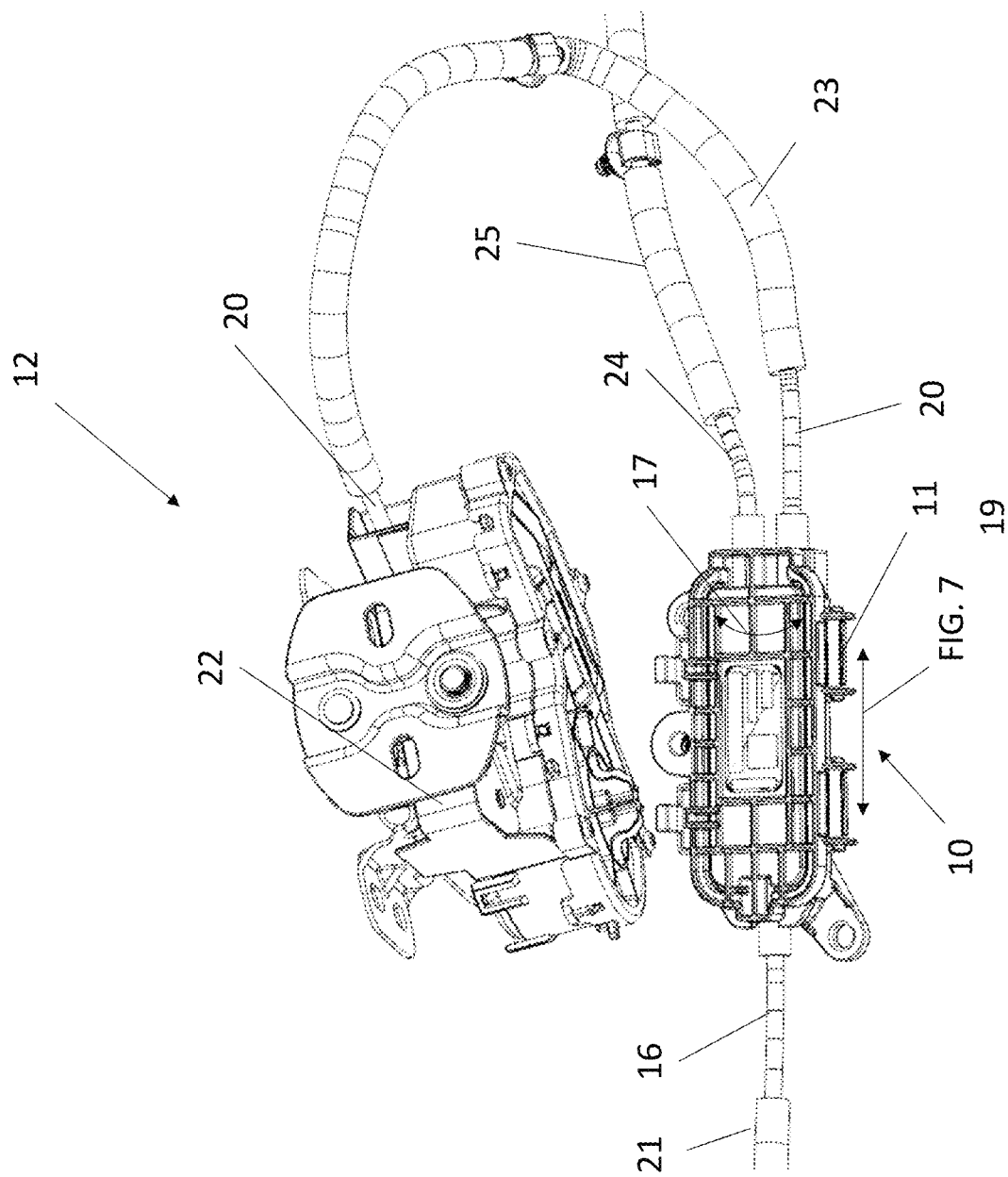
Figure 8:
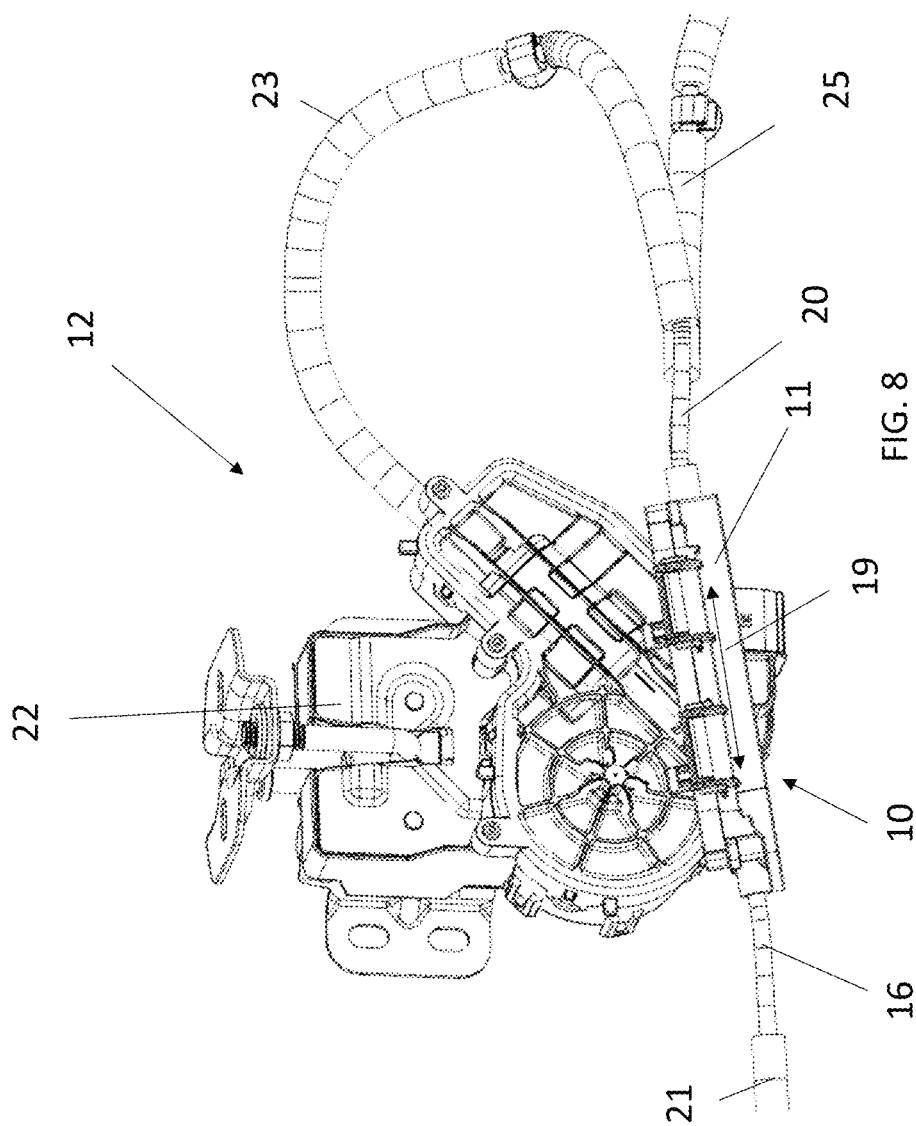

FIG. 1A illustrates a plane view of a release mechanism 10 of the present disclosure. FIG. 1B illustrates an opposite plane view of the release mechanism 10 of FIG. 1B. FIG. 2 is an end view of the release mechanism 10 of FIG. 1A. FIG. 3 is a perspective view of the release mechanism 10 of FIG. 1A. FIGS. 4-8 illustrate a latch system 12 in accordance with the present disclosure. In one embodiment, the latch system 12 may be a vehicle latch system.

Referring now to the FIGS., release mechanism 10 comprises a first housing or first member 14 for securement to a first cable 16. The first housing or first member 14 is slidably received within a housing 11 of the release mechanism 10. In FIGS. 1A-3, the housing is illustrated schematically by dashed lines. The housing 11 in one embodiment may be secured to a portion of a vehicle the latch system is installed in. In addition, the release mechanism 10 further comprises a member or second member or rotatable member 18 rotatably or pivotally secured to the first housing or first member 14 for movement within the housing 11 and with respect to the first housing or first member 14. The member or second member or rotatable member 18 is capable of rotational movement about an axis 15 in the directions of arrows 17. As such, the member or rotatable member 18 rotates within housing 11 and with respect to first housing or first member 14 as the first housing or first member 14 slides within housing 11. The rotatable member or second member 18 is also capable of rotational movement when it is received within the housing 11 and the first housing or first member 14 slides within housing 11 in the direction of arrows 19 (See at least FIG. 5). A second cable 20 of a first latch 22 and a third cable 24 of a second latch 26 are also secured to the member or second member or rotatable member 18. The cables 16, 20 and 24 are slidably received by housing 11.

Cable 16 is also slidably received within a cable sheath 21. Cable 20 is slidably received within a cable sheath 23 and cable 24 is slidably received within a cable sheath 25.

The first cable 16 is also secured to a first or single handle 28 at one end and the first housing 14 at an opposite end. The first cable 16 when pulled and through the use of release mechanism 10 causes cables 20 and 24 to actuate latches 22 and 26 through movement of cable 16. This is due to the fact that the first cable 16 is secured to the first member 14 and as the first cable is pulled the first member 14 slides within housing 11. As the first member 14 slides within the housing a force will be applied to cables 20 and 24 since the second member 18 is secured to the first member 14. As such and when cable 16 is pulled out of the housing 11 the first member 14 slides in the direction of the pulled cable 16 and that force is also applied to cables 20 and 24 pulling them into housing 11. As such and in order to actuate latches 22 and 26 a single pull to cable 16 may be applied to handle 28.

As illustrated, cable 20 is shorter than cable 24 thus the rotational or pivotal movement of member or rotatable member 18 allows both latches 22 and 26 to be actuated by a single cable 16 and a single pull of release lever or handle 28. For example, a hard stop of the cable 20 of latch 22 may occur before the hard stop of the cable 24 of latch 26 or vice versa. The hard stop hard stop of the cable 20 of latch 22 may be due to a component of latch 22 that is coupled to cable 20 reaching its maximum point of travel associated with the pulling of cable 20 similarly the hard stop of the cable 24 of latch 26 may be due to a component of latch 26 that is coupled to cable 24 reaching its maximum point of travel associated with the pulling of cable 24 is pulled. As such, rotational movement of the rotatable member 18 allows both latches 22 and 26 to be actuated by a single cable 16 and single pull of release lever or handle 28 regardless of whether which one of cables 20 and 24 reaches their hard stop first.

As illustrated, the first cable 16 is secured to the first housing or first member 14 at one end and the release lever 28 at the other end. The second cable 20 of the first latch 22 is secured to the first latch 22 at one end and the rotatable member or second member 18 at the other end. The third cable 24 of the second latch 26 is secured to the second latch 26 at one end and the rotatable member second member 18 at the other end.

As illustrated, the second cable 20 of the first latch 22 is secured to one side of the rotatable member 18 and the third cable 24 is secured another side of the rotatable member 18. In one embodiment, these points of securement are on opposite sides of the axis of rotation 15.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A release mechanism for use with multiple latches that are to be released by a single handle and by a single pull, comprising:
    a first member slidably received within a housing;
    a second member rotatably secured to the first member for movement about an axis of rotation within the housing and with respect to the first member, the second member includes a first portion, a second portion, and a curved portion connecting the first portion and the second portion, the first portion and the second portion each being a three-dimensional object having at least two rectangular surfaces extending upwardly and away from a planar surface of the curved portion;
    a first cable secured to the first member and slidably received within the housing;
    a second cable having a portion secured within the first portion of the second member and slidably received within the housing; and
    a third cable having a portion secured within the second portion of the second member and slidably received within the housing.

2. The release mechanism as in claim 1, wherein the second cable is secured to the second member at one side of the axis of rotation of the second member with respect to the first member and the third cable is secured to the second member at an opposite side of the axis of rotation of the second member with respect to the first member.

3. The release mechanism as in claim 1, wherein the first cable is slidably received within a cable sheath.

4. The release mechanism as in claim 1, wherein the first cable is secured to the single handle.

5. The release mechanism as in claim 1, wherein the second cable is shorter than the first cable.

6. A latch system, comprising:
    a first latch;
    a second latch;
    a release mechanism operably coupling a first cable to the first latch and the second latch, the release mechanism comprising:
        a first member slidably received within a housing, the first cable being secured to the first member at a first end; and
        a second member rotatably secured to the first member for movement about an axis of rotation within the housing and with respect to the first member, the second member includes a first portion, a second portion, and a curved portion connecting the first portion and the second portion, the first portion and the second portion each being a three-dimensional object having at least two rectangular surfaces extending upwardly and away from a planar surface of the curved portion;
    a second cable secured to the first latch at one end and an opposite end of the second cable secured within the first portion of the second member, the second cable being slidably received within the housing;
    a third cable secured to the second latch at one end and an opposite end of the third cable secured within the second portion of the second member, the third cable being slidably received within the housing.

7. The latch system as in claim 6, wherein the second cable is secured to the second member at one side of the axis of rotation of the second member with respect to the first member and the third cable is secured to the second member at an opposite side of the axis of rotation of the second member with respect to the first member.

8. The latch system as in claim 6, wherein the first cable is slidably received within a cable sheath.

9. The latch system as in claim 6, wherein the first cable is secured to a handle at a second end, the first end being opposite end to the second end.

10. The latch system as in claim 6, wherein the second cable and the third cable are each slidably received within a cable sheath.

11. The latch system as in claim 6, wherein rotational movement of the second member allows the first member to continue to slide within the housing after either the second cable or the third cable reaches a limit of travel.

12. The latch system as in claim 11, wherein the second cable is secured to the second member at one side of the axis of rotation of the second member with respect to the first member and the third cable is secured to the second member at an opposite side of the axis of rotation of the second member with respect to the first member.

13. The latch system as in claim 12, wherein the first cable is secured to a handle at a second end, the first end being opposite end to the second end.

14. The latch system as in claim 13, wherein the first cable, the second cable and the third cable are each slidably received within a cable sheath.

15. The latch system as in claim 6, wherein the second cable is shorter than the first cable.

16. A method of actuating a first latch and a second latch of a latch system with a first cable, comprising:
    operably coupling the first cable to the first latch and the second latch with a release mechanism, the release mechanism comprising:
        a first member slidably received within a housing, the first cable being secured to the first member at a first end; and
        a second member rotatably secured to the first member for movement about an axis of rotation within the housing and with respect to the first member, the second member includes a first portion, a second portion, and a curved portion connecting the first portion and the second portion, the first portion and the second portion each being a three-dimensional object having at least two rectangular surfaces extending upwardly and away from a planar surface of the curved portion;
    securing a second cable to the first latch at one end and an opposite end of the second cable secured within the first portion of the second member, the second cable being slidably received within the housing;

securing a third cable to the second latch at one end and an opposite end of the third cable secured within the second portion of the second member, the third cable being slidably received within the housing.

17. The method as in claim 16, wherein the second cable is secured to the second member at one side of the axis of rotation of the second member with respect to the first member and the third cable is secured to the second member at an opposite side of the axis of rotation of the second member with respect to the first member.

18. The method as in claim 16, wherein the first cable is secured to a handle at a second end, the first end being opposite end to the second end.

19. The method as in claim 18, wherein the first cable, the second cable and the third cable are each slidably received within a cable sheath.

20. The method as in claim 16, wherein the second cable is shorter than the first cable.

* * * * *